April 15, 1924.
E. E. PARIS
1,490,428
FISHING DEVICE
Filed Feb. 1, 1923
3 Sheets-Sheet 1
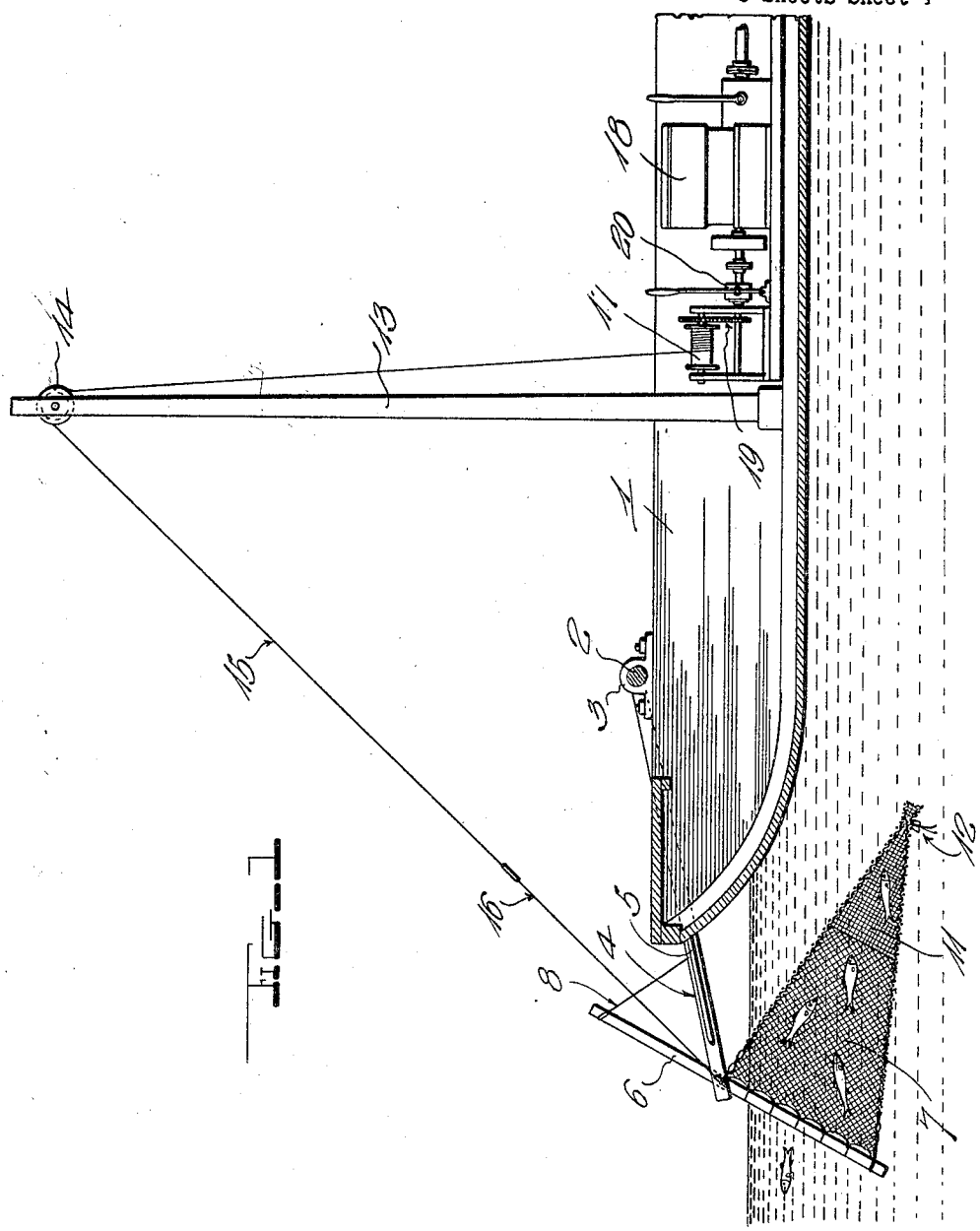
Inventor
E. E. Paris
Witness
By [signature]
Attorneys

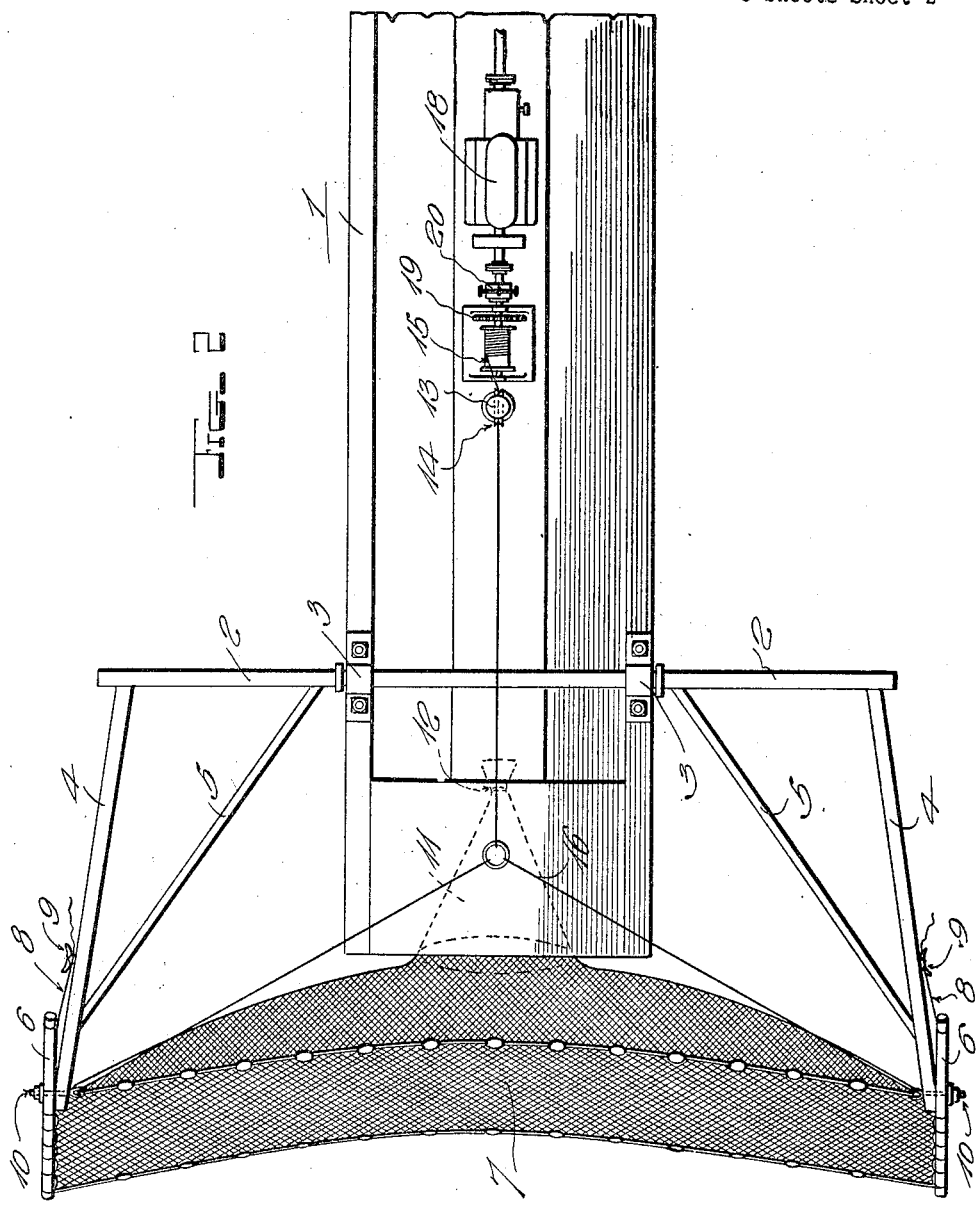

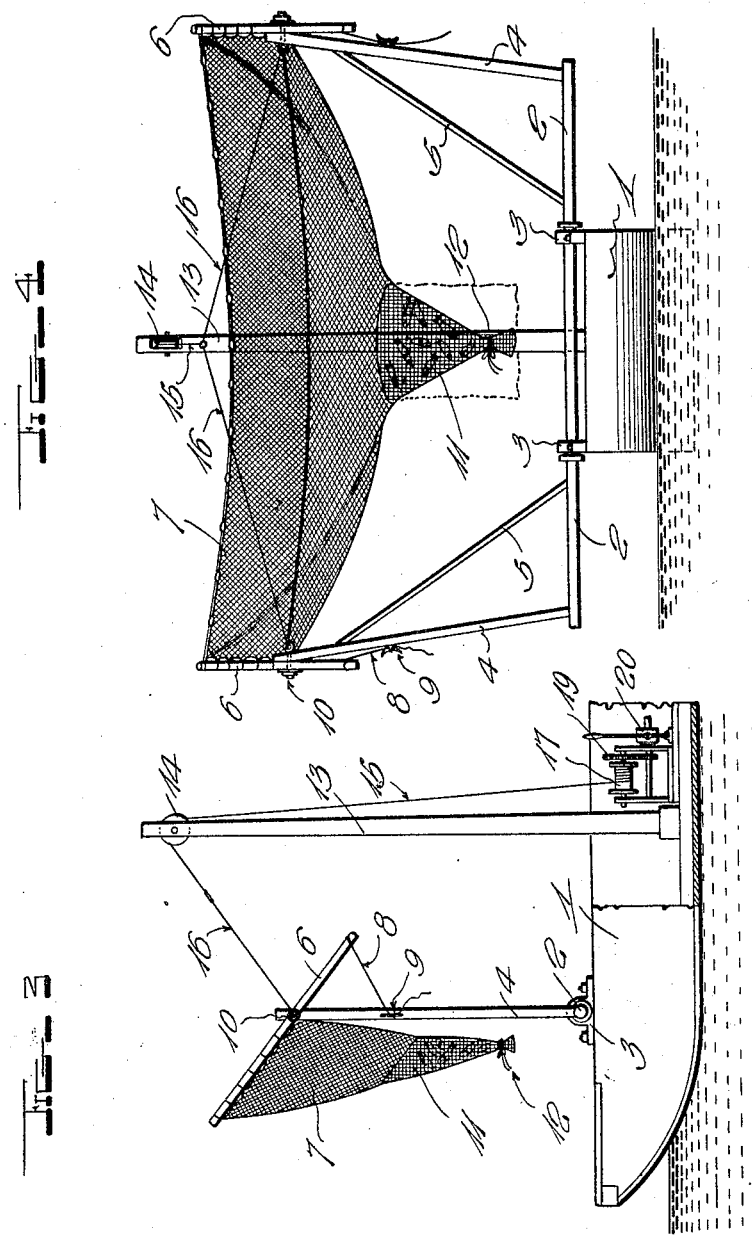

Patented Apr. 15, 1924.

1,490,428

UNITED STATES PATENT OFFICE.

ELMER E. PARIS, OF SAN BENITO, TEXAS.

FISHING DEVICE.

Application filed February 1, 1923. Serial No. 616,411.

*To all whom it may concern:*

Be it known that I, ELMER E. PARIS, a citizen of the United States, residing at San Benito, in the county of Cameron and State of Texas, have invented certain new and useful Improvements in Fishing Devices; and I do declare the following to be a full, clear, and exact description of the invention, such as will enable others skilled in the art to which it appertains to make and use the same.

My invention relates to improvements in fishing devices and more particularly to those of the type employing a scoop net in advance of and moved by a boat, the principal object of the invention being to provide a device of this character having novel means for supporting the net and for elevating the same to a position above the boat, whereby a normally closed fish outlet in the net may be opened, allowing the entire catch to be dumped onto the boat.

With the foregoing in view, the invention resides in the novel subject matter hereinafter described and claimed, the descriptive matter being supplemented by the accompanying drawings.

Figure 1 is a longitudinal section of a fishing device constructed in accordance with my invention, showing the same attached to a boat.

Figure 2 is a top plan view.

Figure 3 is a side elevation partly in section, showing the net elevated above the boat for dumping.

Figure 4 is a front elevation.

In the drawings above briefly described, the numeral 1 designates a boat of any desired form upon which I have shown a transverse beam 2 which extends entirely across the boat and projects beyond opposite sides thereof. In the present showing, the beam 2 is mounted within bearings 3 carried by the boat 1 and may rotate in these bearings as will hereinafter be clear. A pair of booms 4 are secured to the ends of the beam 2 and normally extend forwardly therefrom as shown in Fig. 1, suitable braces 5 being preferably provided to hold the booms 4 in proper relation with said beam 2. Pivoted between their ends to the front ends of the booms 4, are two arms 6 between whose lower portions, a suitable scoop net 7 is strung, while the upper ends of said arms are provided with ropes or cables 8 adapted to be wrapped around cleats 9 or otherwise connected with the booms 4, whereby the arms 6 may be held against movement around their pivots 10, after proper adjustment has been made to dispose the net in the desired manner. At its center, this net is provided with a normally closed fish outlet 11 which is here shown in the form of a sleeve tied at its outer end as at 12. By means hereinafter described, the booms 4 may be swung upwardly to the position shown in Fig. 3, thereby positioning the net 7 above the boat 1, whereupon untying or other opening of the outlet 11 will cause the entire catch of fish to be dumped into said boat.

While any preferred means might be employed for swinging the booms 4 upwardly, I prefer to use the arrangement shown. A mast 13 is carried by the boat 1 and is provided with a sheave 14 over which a cable 15 is trained, the front end of said cable being bifurcated at 16 with its furcations connected to the two booms respectively. At its other end, the cable is wound upon a suitable windlass 17 which may be driven from the propelling motor 18 of the boat 1, through the instrumentality of suitable gearing 19 and a clutch 20. By properly controlling the clutch 20, the booms 4 may be raised to dump a catch of fish into the boat and may again be lowered to re-position the net 7 in the water. The entire arrangement is simple and inexpensive, yet it will be highly efficient and in every way desirable.

Since excellent results may be obtained from the details disclosed, these details may well be followed, but within the scope of the invention as claimed, numerous minor changes may be made.

I claim:

1. A fish catching device for attachment to moving boats comprising a pair of booms adapted to be pivotally connected at their inner ends to the bow of the boat at a point comparatively remote from the extremity of the bow, the outer ends of the booms extending beyond the bow, said booms being disposed in spaced parallelism and the space therebetween being unvariable, a scoop net adapted to be dragged through the water by the moving boat, the front end of said net being open and the opposite end being normally closed to trap the fish in the net, and means for pivotally mounting the net on the forward ends of the booms, said means permitting the angularity of the net with respect to booms to be varied.

2. A fish catching device comprising a pair of booms adapted to be pivotally connected at their inner ends to a boat at a point spaced inwardly from the extremity of the bow thereof, said booms being disposed in spaced parallelism and the space therebetween being unvariable, a scoop net adapted to be dragged through the water for entrapping the fish, said net being permanently stretched and having its front end open and its opposite end closed, supporting arms for the forward end of said net, said supporting arms being pivoted to the forward ends of said booms, adjustable means for rendering said arms relatively fixed to said booms and for varying the angularity of the arms with respect to the latter, and hoisting means for said booms for disposing the discharge end of the net over the boat for dumping the catch into the latter.

3. In a device of the class described, a pair of booms adapted for pivotal connection to a boat, said booms being disposed in substantial parallelism at all times, a pair of arms pivotally connected between their ends to the free ends of said booms, a trapping net stretched between and connected at its open end to said arms, and means associated with said booms and arms for maintaining the latter in different set positions to permit the net to be disposed in the desired angle to said booms.

4. A fish catching device for attachment to moving boats, comprising a beam adapted to extend transversely across the forward portion of the boat, means for connecting the beam with the boat to permit rotation of the beam, a pair of booms secured at their inner ends to the opposite ends of said beam, said booms being disposed in spaced parallelism, a scoop net adapted to be moved through the water by the boat, the front end of said net being open and the opposite end being normally closed to trap the fish during the movement of the boat, and means for pivotally mounting the net on the forward ends of said booms.

In testimony whereof I have hereunto affixed my signature.

ELMER E. PARIS.